United States Patent [19]

Campanella et al.

[11] Patent Number: 5,900,311

[45] Date of Patent: May 4, 1999

[54] THERMOSETTING POLYESTER COMPOSITES PREPARED VIA VACUUM-ASSISTED TECHNIQUE WITH SMOOTH SURFACE APPEARANCE

[75] Inventors: David A. Campanella; Chih-Pin G. Hsu, both of North Kansas City, Mo.

[73] Assignee: Cook Composites and Polymers Co., North Kansas City, Mo.

[21] Appl. No.: 08/217,119

[22] Filed: Mar. 23, 1994

[51] Int. Cl.$^6$ ............ B32B 27/08; B32B 27/12; B32B 27/20; B32B 27/36

[52] U.S. Cl. ............ 428/215; 428/482; 428/483; 264/101; 264/226; 264/255; 264/257; 264/258; 264/511; 264/513; 264/516; 156/382; 156/500; 523/500; 425/405.1

[58] Field of Search ............ 264/101, 129, 264/255, 257, 258, 266, 271, 500, 511, 513, 516, 241, 271.1, 279, 279.1, 225, 226; 425/388, 389, 405.1, 546; 525/437, 440, 444, 445, 447; 524/601; 528/302, 303, 304, 306; 523/500, 511, 522, 523, 526, 527; 428/280, 286, 287, 288, 289, 290, 292, 297, 298, 302, 482, 483, 215; 156/381, 382, 500

[56] References Cited

U.S. PATENT DOCUMENTS

| | | | |
|---|---|---|---|
| 2,913,036 | 11/1959 | Smith | 154/1.6 |
| 3,701,748 | 10/1972 | Kroekel | 260/40 |
| 3,753,843 | 8/1973 | Hutchison | 161/43 |
| 4,132,755 | 1/1979 | Johnson | 264/553 |
| 4,312,829 | 1/1982 | Fourcher | 264/571 |
| 4,525,498 | 6/1985 | Atkins et al. | 523/511 |
| 4,902,215 | 2/1990 | Seemann, III | 425/406 |
| 5,009,821 | 4/1991 | Weaver | 264/22 |
| 5,052,906 | 10/1991 | Seemann | 425/112 |
| 5,082,878 | 1/1992 | Bansleben et al. | 523/203 |
| 5,104,983 | 4/1992 | Stock et al. | 524/141 |
| 5,162,401 | 11/1992 | Ross et al. | 523/511 |
| 5,202,366 | 4/1993 | Reid et al. | 523/516 |
| 5,213,747 | 5/1993 | Lippert | 264/226 |
| 5,256,709 | 10/1993 | Ross et al. | 523/510 |
| 5,305,568 | 4/1994 | Beckerman | 52/309.4 |
| 5,376,721 | 12/1994 | McGarry et al. | 525/64 |
| 5,386,963 | 2/1995 | Nasvik | 249/16 |
| 5,399,621 | 3/1995 | Kohlhammer | 525/263 |
| 5,401,803 | 3/1995 | Rex | 525/170 |

FOREIGN PATENT DOCUMENTS

| | | |
|---|---|---|
| 91/76416 | 8/1991 | Australia . |
| 414468 | 2/1991 | European Pat. Off. . |
| 438814 | 7/1991 | European Pat. Off. . |
| 560113 | 9/1993 | European Pat. Off. . |
| 944955 | 12/1963 | United Kingdom . |
| 2278117 | 5/1993 | United Kingdom . |
| 92/01727 | 7/1990 | WIPO . |
| 95/09202 | 8/1993 | WIPO . |

OTHER PUBLICATIONS

D.R. Paul et al., Eds., *Polymer Blends*, vol. II, Chapter 23 by K. E. Atkins, New York Academic Press, pp. 391 *et seq.* (1978).

*Primary Examiner*—Vivian Chen
*Attorney, Agent, or Firm*—Whyte Hirshboeck Dudek S.C.

[57] ABSTRACT

Fiber-reinforced thermosetting polyester composites containing in excess of 30 wt %, based on the weight of the composite, reinforcing fiber, are made by a vacuum-assisted transfer molding technique from a 1-phase composite matrix precursor comprising a polyester, a reactive monomer, and a low-profile additive. The polyester has a molecular weight/double bond factor of between about 150 and 190, styrene is a preferred reactive monomer, and a preferred low-profile additive is a thermoplastic polymer with a weight average molecular weight in excess of 3,000 and which is miscible in the polyester and reactive monomer. The polyester composite is formed by coating the surface of a mold with a gel coat; applying a skin laminate over the partially cured gel coat; applying a fiber reinforcement to the skin laminate; closing the mold; and injecting the 1-phase matrix precursor while the mold is under vacuum. The hallmark of these composites is their combination of physical strength as measured by one or more standard strength tests for composites and smooth surface profile as compared to the thermosetting polyester composites made from a typical hand lay-up or spray up process, or a conventional vacuum-assisted transfer molding process.

18 Claims, No Drawings

THERMOSETTING POLYESTER COMPOSITES PREPARED VIA VACUUM-ASSISTED TECHNIQUE WITH SMOOTH SURFACE APPEARANCE

FIELD OF THE INVENTION

This invention relates to fiber-reinforced thermosetting polyester composites. In one aspect, the invention relates to such composites made with a vacuum-assisted transfer molding technique while in another aspect, the invention relates to such composites made from low or zero shrinkage polyester resin systems. The physical strength of the composites of this invention is much greater than the physical strength of similar composites made from conventional hand lay-up, spray-up, or resin transfer molding techniques, and the surface appearance of these composites is much smoother than the surface appearance of similar composites presently made by vacuum-assisted techniques. The composites of this invention can serve as the cosmetic surface of a molded object, e.g. a boat hull, without the finishing steps of sanding and polishing.

BACKGROUND OF THE INVENTION

Composite materials are known to have the advantages of high strength, light weight, design flexibility, dimensional stability, corrosion resistance, parts consolidation, better finishing, and low tooling cost over traditional construction materials such as metal, ceramics, and wood. Fiber-reinforced thermosetting polyester composites are widely used in many applications, e.g. marine, automotive, transportation, electrical, construction, consumer and industrial goods, etc. Compared to the composites made from other types of thermosetting resins such as vinyl ester, epoxy, and polyamide, thermosetting polyester composites have the advantages of lower material cost and easy material handling during processing. Therefore, unsaturated polyester resins are the materials of choice for most of the fiber-reinforced thermosetting composites in applications in which the working environment of the composite is not very harsh.

Fiber-reinforced thermosetting polyester composites usually consist of reinforcing (or reinforcement) fibers, either in chopped or continuous form, embedded in a matrix of one or more unsaturated polyester resins. The unsaturated polyester resins are made from a reaction of one or more glycols with an unsaturated dicarboxylic acid or its anhydride, or with a mixture of the unsaturated acid or its anhydride with a saturated dicarboxylic acid or its anhydride. The molecular weight of the polyester is controlled through any conventional means, e.g. by the addition of dicyclopentadiene to the reaction mixture.

In the formation of the matrix, the unsaturated polyester resin is blended typically with (1) one or more monomers capable of crosslinking with the vinyl groups in the polyester, (2) one or more peroxide initiators, (3) promoters for use in combination with the initiator, and (4) various other additives which impart desired characteristics to the matrix upon cure or which will improve the processing and/or curing properties of resin. This precured blend of components is known by various names including matrix precursor, matrix reaction mixture, and the like.

The physical and chemical properties of the composite, such as its physical strength, physical modulus, flexibility, and heat distortion temperature, can be controlled by appropriate selection of the starting glycols and dicarboxylic acids in the manufacture of unsaturated polyester resin, or the crosslinking monomers, initiators, fillers, fibers, and other additives used in the preparation of composite. As a result, a wide array of fiber-reinforced thermosetting polyester composites can be prepared through the appropriate selection of starting materials, and some of these composites are particularly useful in the manufacture of strong, relatively light weight plastic parts.

Various processing methods can be applied to produce fiber-reinforced thermosetting polyester composites. The hand lay-up and spray-up processes are the most common practices in the manufacture of large and complex composite parts, such as boat hulls and truck body panels. Continuous or chopped fiber mats are impregnated with and engulfed in a matrix resin, and the resin is cured without additional heat or pressure. The typical fiber reinforcement (e.g. glass fiber) content of a composite made by these techniques is about 20 to 40% by weight, based on the cured weight of the composite. Therefore, the physical strength (as measured by any one of a number of different tests) of these composites is typically not very great and if greater physical strength is desired for a particular application, then a thicker composite is usually required (the physical strength of a composite being a function of the fiber content of the composite and its thickness). Moreover, the surface appearance of the finished part made with these methods may vary from part to part depending on various factors, e.g. processing conditions, the nature of the thermosetting resin, and the like.

Thermosetting polyester composites with better physical strength and/or consistent surface appearance can be produced by other types of manufacturing techniques, such as filament winding, compression molding, transfer molding, injection molding, and pultrusion. These techniques can produce parts with very high fiber content, typically 50 to 70% by weight. However, the nature of these processes, and in some the added tooling and operational costs, prevent their use in the manufacture of very large and complex parts such as those described above.

With the introduction of vacuum-assisted transfer molding as described in U.S. Pat. No. 4,902,215 and U.S. Pat. No. 5,052,906, both of which are incorporated herein by reference, very large, complex and physically strong composites can be manufactured with relatively low tooling and operational costs. Composites made by this technique lend themselves well to the manufacture of large, complex, strong and relatively light weight plastic parts. However, because a composite made by vacuum-assisted transfer molding has a very high fiber content, the cosmetic surface appearance of the composite is more sensitive to the shrinkage that naturally occurs during the cure of a thermosetting polyester resin. significant fiber pattern print through can be observed, sometimes even through both a skin laminate and gel coat applied to the surface of the composite construction. Correction of this problem by sanding and polishing after the composite is made requires considerable effort which undermines, or even may eliminate, the savings in operating and material costs otherwise gained from using a vacuum-assisted technique.

The composite industry holds a continuing interest in the development of a method for the manufacture of a fiber-reinforced thermosetting polyester composite that possesses both great physical strength, relative to a composite made from a traditional hand lay-up and spray-up method, and a smooth surface appearance relative to a composite made from a vacuum-assisted method. Such a composite will be a ready candidate for molded parts, especially parts of large size and/or complex shape, requiring both physical attributes.

SUMMARY OF THE INVENTION

According to this invention, fiber-reinforced thermosetting polyester composites containing in excess of 30 weight percent, and preferably in excess of 40 weight percent, based on the weight of the composite, reinforcing fiber, are made by a vacuum-assisted transfer molding technique from a one-phase composite matrix precursor comprising a polyester, a reactive monomer, and a low profile additive, i.e. a thermoplastic polymer with a weight average molecular weight in excess of about 3,000 and which is miscible in the polyester and reactive monomer. The reinforcing fiber is typically in the form of a continuous fiber mat, and the matrix precursor is a low or zero shrinkage polyester resin system. The hallmark of these composites is their combination the physical strength (as measured by one or more standard strength tests for composites) and smooth surface profile (as compared to the thermosetting polyester composites made from a typical hand lay-up or spray-up process, or a conventional vacuum-assisted transfer molding process).

Molded articles in which the composites of this invention are used as a component usually comprise a layer of gel goat, typically 10 to 25 mils in thickness, as the surface coating. A skin laminate, typically 10 to 30 mils in thickness, is applied behind the gel coat to improve the hydrolytic stability and surface smoothness of the molded article. The fiber content of the skin laminate typically ranges from 25 to 45% by weight, and the fiber typically is either in the form of 0.5 to 2 inch chopped fiber or a sheer of a continuous strand fiber mat.

DESCRIPTION OF THE PREFERRED EMBODIMENTS

The unsaturated polyester resins used in the invention are known in the art. Preferred resins are those with a molecular weight/double bond or vinyl group (—C=C—) factor between about 150 and about 190, more preferably between about 155 and about 170 (as further described in U.S. Pat. No. 3,701,748 which is incorporated herein by reference). These resins are made from a reaction of one or more glycols with an unsaturated dicarboxylic acid or its anhydride or with a mixture of the unsaturated acid or its anhydride with a saturated dicarboxylic acid or its anhydride. The reaction mixture may also include dicyclopentadiene to control the molecular weight of the polyesters. The unsaturated polyester resin typically has a number average molecular weight in the range from about 500 to about 5,000, preferably in the range from about 700 to about 2,000.

The unsaturated dicarboxylic acid or its anhydrides used in the preparation of the unsaturated polyester include maleic acid or anhydride, fumaric acid, citraconic acid, mesaconic acid, methyl maleic acid, and itaconic acid. Preferred examples of unsaturated dicarboxylic acids are maleic acid or anhydride, and fumaric acid. A minor proportion of the unsaturated acid, up to about 30 mole percent, can be replaced by one or more saturated dicarboxylic acids. Examples of saturated dicarboxylic acids are phthalic acid or anhydride, isophthalic acid, terephthalic acid, tetrahydrophthalic anhydride, succinic acid, adipic acid, sebacic acid, and dimerized fatty acids.

The glycols used in the preparation of the unsaturated polyesters include ethylene glycol, diethylene glycol, triethylene glycol, propylene glycol, dipropylene glycol, tripropylene glycol, butylene glycols, neopentyl glycol, 1,3- and 1,4-butane diols, 1,5-pentane diol, 1,6-hexanediol, glycerol, 1,1,1-trimethylolpropane, bisphenol A, hydrogenated bisphenol A, and other glycols. The reaction mixture may also include dicyclopentadiene to modify, as described in U.S. Pat. No. 3,883,612 and U.S. Pat. No. 3,986,922 (both of which are incorporated herein by reference), the molecular weight of the polyesters. The amount of unsaturated polyester resin in the matrix precursor (i.e. polyester resin, reactive monomer, thermoplastic resin, initiator and additives) is usually between about 20 and about 60 percent, preferable between about 30 and 50 percent, by weight.

To form the matrix precursor, the unsaturated polyester resin is blended with one or more monomers capable of crosslinking with the vinyl groups in the resin, a thermoplastic polymer, one or more peroxide initiators, optionally one or more initiator promoters, and optionally one or more other additives to improve the processing and/or curing properties of the resin, and/or to impart one or more desired features to the composite. These materials are blended using any conventional blending technique, e.g. stirring, shaking, etc.

Any reactive monomer that will copolymerize with the vinyl groups of the unsaturated polyester resin can be used in the practice of this invention. These monomers include such materials as styrene, vinyl toluene, p-methyl styrene, chlorostyrene, t-butyl styrene, diallyl phthalate, mono- or multifunctional lower alkyl esters of the acrylic or methacrylic acids such as methyl methacrylate and glycol diacrylate, and the like. The amount of monomer in the matrix precursor ranges between about 30 to about 70 percent, preferably between about 40 to about 60 percent, by weight. Styrene is the reactive monomer of choice.

The thermoplastic polymers used as a low profile additive are those that are miscible with the polyester resin and reactive monomer such that upon blending one with the others, a one-phase matrix precursor is formed. These polymers include polyvinyl acetate, polyester-based polyurethanes, polycaprolactones, cellulose acetate butyrate, and the various saturated polyesters. The weight average molecular weight of these polymers can range from about 3,000 to about 1,000,000, preferably from about 5,000 to about 500,000. The amount of thermoplastic polymer present in the matrix precursor ranges between about 1 to about 25 percent, preferably between about 5 to about 20 percent, by weight.

The viscosity of the matrix precursor is typically in the range between about 100 to about 1000 centipoise (cp), preferably between about 150 to about 500 cp. Although not preferred, a certain amount of filler can be added to the matrix precursor. Acceptable fillers include natural or precipitated calcium carbonates, clay, silica, talc, mica, and hydrated alumina. If present, the amount of filler added to the matrix precursor is typically less than about 10 percent, preferably less than about 5 percent, by weight, based on the weight of the matrix.

The matrix precursor is cured through the action of one or more free radical initiators, such as an organic peroxide compound, e.g. t-butyl perbenzoate, benzoyl peroxide, cumene hydroperoxide, t-butyl peroctoate, methyl ethyl ketone peroxide, and others known in the art. The minimum amount of such initiator used is a initiating amount, and typical amounts present in the matrix precursor range from about 0.1 to about 3 percent by weight, based on the weight of the matrix.

Other materials that can be present in the matrix precursor include polymerization inhibitors, accelerators and other types of additives to improve the processing and/or curing properties of the resin, and/or which impart one or more desired features to the composite. These other materials are used in known amounts and in known ways.

The gel time of the matrix precursors of this invention will vary with, among other things, the compositional nature of the precursor and the cure conditions, but it is typically between about 5 to about 75 minutes, preferably between about 15 to about 60 minutes, in the absence of using a heat supplement during the cure process.

The vacuum-assisted transfer molding techniques used in the practice of this invention include those described in U.S. Pat. No. 4,902,215, U.S. Pat. No. 5,052,906, U.S. Pat. No. 4,132,755, U.S. Pat. No. 4,312,829, and U.S. Pat. No. 2,913,036, all of which are incorporated herein by reference. The preferred techniques are those described in U.S. Pat. No. 4,902,215 and U.S. Pat. No. 5,052,906. These techniques can produce composite materials with a high fiber content, i.e. in excess of 40 percent, typically between about 50 and 80 percent, by weight based on the weight of composite. Moreover, these techniques are particularly useful in the preparation of large, complex shapes such as boat hulls and truck body panels.

The composites of this invention are usually combined with a layer of gel coat and a layer of skin laminate to form a molded part. The gel coat is typically 10 to 25 mils in thickness, and is the surface coating of the molded part. The gel coat provides the finishing color and surface profile of the part. Gel coats are well known and various grades are commercially available. The selection of gel coat will depend upon the desired characteristics of the part relative to, among other things, weatherability, hydrolytic stability, and surface finishing.

The layer of skin laminate, typically 10 to 30 mils in thickness, can be applied behind the gel coat to improve the hydrolytic stability and surface smoothness of the molded part. The skin laminate provides an extra barrier to the composite from hydrolytic attack during the employment of the part. The skin laminate also provides protection to the gel coat from the reaction heat and shrinkage normally incident to the cure of the composite. Moreover, the thermosetting resins typically used in the preparation of the skin laminate usually exhibit better hydrolytic stability than those used in the preparation of the composite. Examples of these resins include vinyl esters, vinyl ester modified epoxies, and vinyl ester modified unsaturated polyester resins. The typical fiber content of a skin laminate ranges from about 25 to about 45 percent by weight. The fiber used in the skin laminate is typically either about 0.5 to about 2 inch chopped fiber or a sheer of a continuous strand fiber mat.

The main structure of the molded part can also include a core insert. An insert is used in those applications in which weight reduction is a factor in the design of the part. The core insert can also serve as a supplement reinforcement material to the composite. Examples of core materials include polyurethane foam, honeycomb structures made from various light weight material, and balsa wood. The thickness of the core can vary widely, but is typically between about 0.1 inch to more than 2.0 inches, the exact dimension a function of, among other things, the physical strength and weight requirements of the molded part.

Typically, most of the strength characteristics of the molded part are a function of the strength characteristics of the composite, and these characteristics in turn are a function of the amount and nature of the reinforcing fiber. Usually, continuous fiber mats with various weight/area ratios are used in the construction of the composite to provide the desired strength/weight performance to the part. Examples of the various types of reinforcement fibers that can be used in the practice of this invention are glass fibers, carbon fibers, various aramid fibers, and other types of natural and synthetic fibers. The typical fiber content of the composite is between about 50 and about 80 percent by weight.

The composite and the molded part can, and often are, constructed in one operation. First, a gel coat is usually applied to the surface of the mold, at least partially cured, and then a skin laminate is applied over the at least partially cured gel coat. These are open mold operations. Then the fiber reinforcement is applied to the skin laminate, the mold closed, and the matrix precursor injected under vacuum. The precursor is then allowed to cure, with or without a heat supplement, and the part or article demolded.

During the construction of the molded part or article, all reinforced materials, i.e. the composite, skin laminate and, perhaps, the core insert, are employed under dry conditions. As such, these components can be prepared without undue deference to time. Once prepared, resin is injected into the mold under a vacuum condition through one or more injection paths. The mold filling time can be controlled by the number of injecting paths and the strength of the vacuum. The gel or cure time of is usually about 5 to 10 minutes longer than the fill time. Large, e.g. 100 feet by 20 feet, parts of complex shape can be made in a single molding process. Because the entire process is under a vacuum condition, the emission of monomers is minimum during the preparation of composites and molded parts.

The invention is further described by the following examples. All percentages are by weight unless otherwise indicated.

SPECIFIC EMBODIMENTS

Measurement of Surface Appearance

The rating value (ACT™ Orange Peel Standards) are typical industry visual test methods used to describe the surface appearance of an object. A BYK-GARDNER™ wave-scan was used to measure the surface appearance of various test panels. The wave-scan can report the results in both long-term (structure size greater than 0.6 mm) and short-term waviness (structure size less than 0.6 mm). Both long-term and short-term waviness are rated from 0 to 100. The higher the number, the more waviness is observed. The long-term and short-term waviness are then mathematically correlated to a surface rating value from 0 to 10. The higher the number, the smoother the surface appears.

EXAMPLE 1

A three-component matrix precursor was prepared from an unsaturated polyester, a thermoplastic polymer, and styrene. The unsaturated polyester (I) was prepared by esterifying 1.1 moles of propylene glycol with 0.83 moles of maleic anhydride and 0.17 moles of isophthalic acid to an acid number of 30. The polyester was then dissolved in styrene to a concentration of 63% solids. This unsaturated polyester had an average molecular weight/vinyl group (—C=C—) factor of 165.

The thermoplastic polymer (II) was a polyvinylacetate with a number average molecular weight of between 80,000–150,000. This polymer was then dissolved in styrene to a concentration of 17% solids. Fifty-four parts of the polyester/styrene solution was then blended with forty-six parts of the vinyl acetate/styrene solution to yield a liquid, one-phase matrix percursor composition. This precursor composition (III) contained:

|  | parts |
| --- | --- |
| Unsaturated polyester | 34 |
| Thermoplastic polymer | 8 |
| Styrene | 58 |

For control purposes a conventional unsaturated polyester/styrene resin (IV) was commercially obtained. It is the polycondensation product of isophthalic acid, maleic anhydride, dicyclopentadiene (12.2%/87.8%/41% mole ratio) and ethylene glycol, diethylene glycol (32.4%/32.4% mole ratio) having an acid number of 20 dissolved in styrene at 65%.

The resinous compositions, together with commercially available cobalt and co-promoters, were mixed for 30 minutes to form homogenous mixtures. These mixtures were catalyzed for cure with methyl ethyl ketone peroxide initiator. The gel time of these homogeneous mixtures was about 45 minutes at ambient temperature.

A high strength, fiberglass reinforced panel was made on a flat mold at ambient temperature pursuant to the techniques described in U.S. Pat. No. 4,902,215 and U.S. Pat. No. 5,052,906. The fiberglass reinforcements consisted of four layers of PPG 2 oz chopped strand mat. The fiber content of the composite was about 55% by weight based on the weight of composite.

A fiberglass reinforced panel was made on a flat mold at ambient temperature using a conventional hand lay-up technique. The fiber content of the composite was about 34% by weight based on the weight of composite.

On analysis of ASTM D-790 and ASTM D-638 properties, the composite made with matrix precursor III and a vacuum-assisted transfer molding technique showed favorably higher strength than that prepared with the conventional hand lay-up technique as shown in Table 1. The finishing side of the composite made with matrix precursor III also exhibited an extremely smooth surface as compared to the panel made with resin IV (which exhibited grossly undulating surfaces typical of panels made from unsaturated polyesters/monomers of the prior art) as shown in Table 2.

TABLE 1

| Sample | ASTM D-790 | ASTM D-638 | Glass Content |
| --- | --- | --- | --- |
| High glass lamination with resin composition (III) | 32,550 psi | 18,620 psi | 55% |
| Hand lay-up laminate with resin composition (IV) | 23,590 psi | 10,020 psi | 34% |

TABLE 2

| Sample | Long-term waviness | Short-term waviness | Surface rating value |
| --- | --- | --- | --- |
| High glass lamination with resin composition (III) | 2.4 | 0.3 | 9.8 |
| Hand lay-up laminate with resin composition (IV) | 10.4 | 3.1 | 7.2 |

EXAMPLE 2

An unsaturated polyester (V) prepared by esterifying 1.1 mole of propylene glycol with 1.0 mole of maleic anhydride to an acid number of 25 to 35 was blended with a saturated polyester thermoplastic polymer (VI) with a number average molecular weight of 1,000 to 5,000. The unsaturated polyester had an average molecular weight/vinyl group factor of 156. Both resins were dissolved in styrene at various solid contents. The composition of the resulting matrix precursor (VII) was as follows:

|  | parts |
| --- | --- |
| Unsaturated polyester (V) | 42 |
| Thermoplastic polymer (VI) | 12 |
| Styrene | 46 |

The matrix precursors were used and molded by the vacuum-assisted method described in Example 1.

Upon analysis of the surface profiles of the composites prepared from these matrix precursors, the composite prepared from matrix precursor VII had a far superior surface smoothness than the composite prepared from matrix precursor IV in the panels made by vacuum-assisted transfer molding as shown in Table 3.

TABLE 3

| Sample | Long-term waviness | Short-term waviness | Surface rating value |
| --- | --- | --- | --- |
| Composite VII | 17.7 | 22.1 | 5.6 |
| Composite IV | 62.2 | 51.8 | 1.8 |

EXAMPLE 3

Matrix precursor III and conventional matrix precursor IV, both as described in Example 1, were compared for surface profile improvements on a gel coated surface to simulate construction of boat assemblies. The fiberglass reinforced panel design was as follows:

4 layers of 2 oz PPG chopped strand mat 1 layer 20 mil veil Nico Fibers

Gel coated surface on mold

The matrix precursors were used and molded by the vacuum-assisted method described in Example 1.

Upon analysis of the surface profile of the resulting molded parts, the part made from matrix precursor III had a far superior surface smoothness than the part made from matrix precursor IV as reported in Table 4.

TABLE 4

| Sample | Long-term waviness | Short-term waviness | Surface rating value |
| --- | --- | --- | --- |
| Part III | 6.5 | 16.0 | 7.8 |
| Part IV | 25.1 | 43.7 | 4.8 |

EXAMPLE 4

Matrix precursor III and conventional matrix precursor IV were compared for surface profile improvements on a gel coated surface to simulate light weight sections of a boat. The fiberglass reinforced panel design was as follows:

1 layer PPG 1808 combination mat 1 layer ⅜" balsa core material 3 layers 1.5 oz PPG chopped strand mat 1 layer 20 mil veil Nico Fibers Gel coated surface of mold The matrix precursors were used and molded by the vacuum-assisted method described in Example 1.

Upon analysis the degree of surface smoothness was much improved for both molded parts shown in Table 5. However, the molded part made from matrix precursor III still had a far superior surface smoothness than the part made from matrix precursor IV.

TABLE 5

| Sample | Long-term waviness | Short-term waviness | Surface rating value |
| --- | --- | --- | --- |
| Part III | 0.9 | 1.5 | 10.5 |
| Part IV | 16.0 | 10.5 | 6.0 |

The preceding examples are for illustrative purposes only, and these examples are not to be construed as a limitation upon the invention as described in the following claims.

What is claimed is:

1. A vacuum-assisted transfer molding process for preparing a molded article comprising a fiber-reinforced thermosetting polyester composite, the composite comprising reinforcing fiber in excess of 30 wt %, based upon the weight of the composite, in a thermoset polyester matrix, wherein the process comprises:
    (a) coating the surface of a mold with a gel coat;
    (b) allowing the gel coat of step (a) to at least partially cure;
    (c) applying a skin laminate over the at least partially cured gel coat of step (b);
    (d) applying fiber reinforcement to the skin laminate of step (c);
    (e) closing the mold; and
    (f) while the mold is under vacuum, injecting a one-phase matrix precursor comprising, in weight percent based upon the weight of the matrix precursor, from about 20 to about 60% of an unsaturated polyester resin with a molecular weight/double bond factor between about 150 and about 190; 30 to about 70% of a reactive monomer; 1 to about 25% of a thermoplastic polymer which is miscible in a bend of the polyester resin and the reactive monomer; and an initiating amount of a free radical initiator.

2. The process of claim 1 in which the composite comprises reinforcing fiber in excess of about 50 weight percent.

3. The process of claim 2 in which the matrix precursor comprises from about 30 to about 50 weight percent unsaturated polyester resin.

4. The process of claim 3 in which the matrix precursor comprises from about 40 to about 60 weight percent reactive monomer.

5. The process of claim 4 in which the matrix precursor comprises from about 5 to 20 weight percent thermoplastic polymer.

6. The process of claim 5 in which the unsaturated polyester resin has a molecular weight/double bond factor from about 155 to about 170.

7. The process of claim 6 in which the number average molecular weight of the unsaturated polyester resin is from about 500 to about 5000.

8. The process of claim 7 in which the weight average molecular weight of the thermoplastic polymer is from about 3,000 to about 1,000,000.

9. The process of claim 8 in which the thermoplastic polymer is selected from the group consisting of polyvinyl acetate, polyester-based polyurethanes, polycaprolactones, cellulose acetate butyrate, and saturated polyesters.

10. The process of claim 9 in which the free radical initiator is an organic peroxide.

11. The process of claim 10 in which the matrix precursor comprises from about 0.1 to about 3 weight percent initiator.

12. The process of claim 1 in which the skin laminate is between about 10 to 30 mils in thickness.

13. The process of claim 1 in which the skin laminate is made up of resins selected from the group consisting of vinyl esters, vinyl ester modified epoxies, and vinyl ester modified unsaturated polyester resins.

14. The process of claim 1 in which the composite reinforcing fiber in excess of 40 weight percent.

15. A molded article made by the process of claim 1
    a. the gel coat;
    b. the composite; and
    c. the skin laminate between the gel coat and the composite.

16. The molded article of claim 15 further comprising a core insert.

17. The molded article of claim 16 in the shape of a boat hull or deck section.

18. The molded article of claim 16 in the shape of a truck body panel.

* * * * *

UNITED STATES PATENT AND TRADEMARK OFFICE
CERTIFICATE OF CORRECTION

PATENT NO. : 5,900,311
DATED : May 4, 1999
INVENTOR(S) : David A. Campanella, et al It is certified that error appears in the above-indentified patent and that said Letters Patent is hereby corrected as shown below:

Column 2, line 50: Replace "resin. significant" with --resin. Significant--.

Column 3, line 15: Replace "the" with --of--.

Column 6, line 62: Replace "80.000-150.000" with --80,000-150,000--.

Column 8, line 3: Replace with "1.000 to 5.000" with --1,000 to 5,000--.

Column 9, line 41: Replace "bend" with --blend--.

Column 10, line 16: Replace "3.000 to about 1.000.000" with --3,000 to about 1,000,000--.

Column 10, line 32: After "composite" add --comprises--.

Column 10, line 34: After "claim 1" add --comprising--.

Signed and Sealed this

Twelfth Day of October, 1999

*Attest:*

Q. TODD DICKINSON

*Attesting Officer*  *Acting Commissioner of Patents and Trademarks*